Jan. 24, 1961  G. AGINS  2,968,953
STABILIZING SYSTEM CORRECTING MECHANISM
Filed March 31, 1948
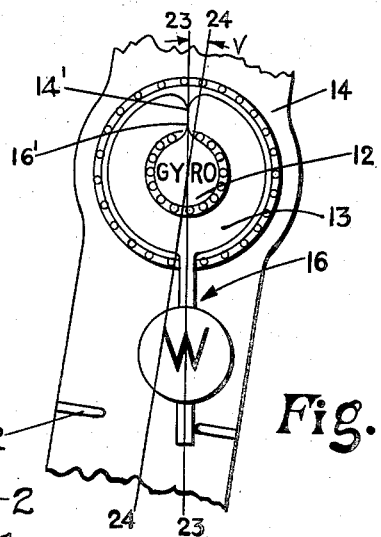
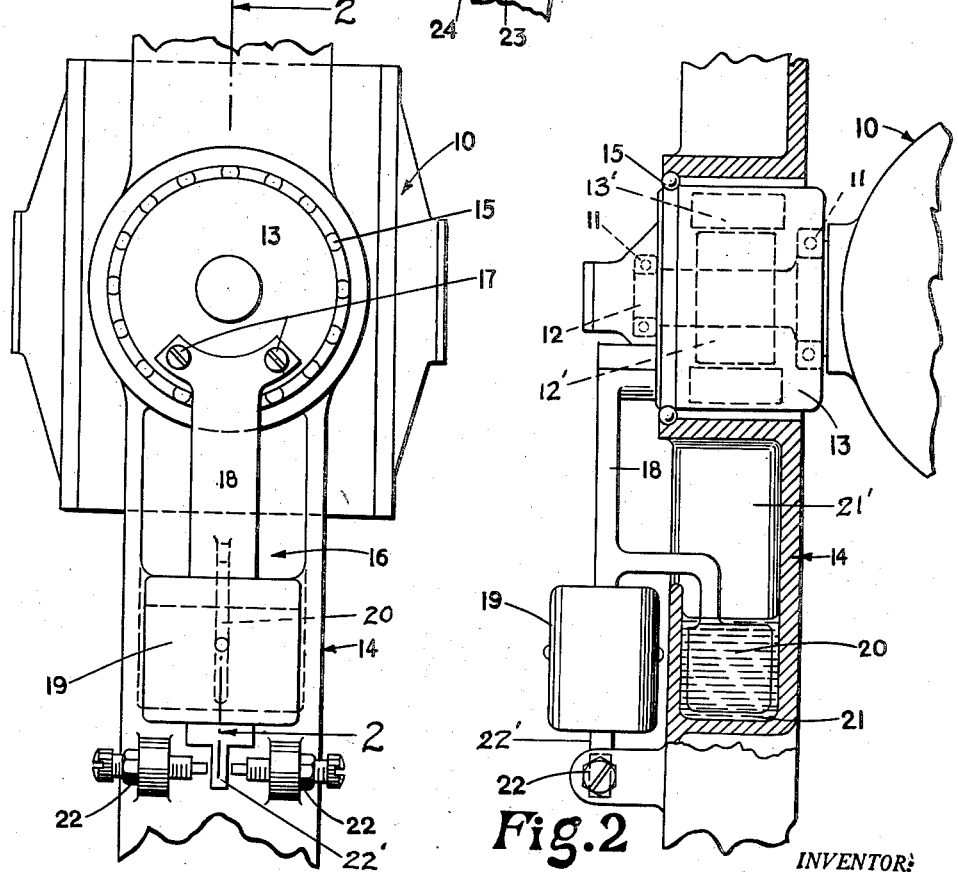
INVENTOR:
George Agins
BY
Campbell, Brumbaugh & Free
ATTORNEYS

# United States Patent Office 2,968,953
Patented Jan. 24, 1961

2,968,953
STABILIZING SYSTEM CORRECTING MECHANISM

George Agins, Brooklyn, N.Y., assignor to American Bosch Arma Corporation

Filed Mar. 31, 1948, Ser. No. 18,187

14 Claims. (Cl. 74—5.4)

This invention relates to improvements in gyrocompasses and other gyrostabilized elements, and has particular reference to means for correcting errors in the usual stabilizing system responsive to tilt between the sensitive element relatively to an independent stable element, such as a pendulum or gyrostabilized element.

It has been relatively common practice to utilize a pendulum as a reference member for stabilizing one element of an electrical inductive pick-up device, whose other element is carried by the unstable member, so that the voltage induced in the device in response to relative movement is proportional thereto and, when impressed on a reversely-driving torque motor effects restoration of the unstable member. For example, a stabilized compass is shown and described in U.S. Patent 2,802,279, issued August 13, 1957 for Gyrocompass, where the tilt of a compass gyroscope is used as an azimuth error indication and causes a torque to be appl ed for correcting the error. In another U.S. Patent 2,810,291 for Gyroscopic Instruments, issued October 22, 1957 to Ronald L. Bishop and Robert W. Mahland, a specially designed mechanism for detecting tilt and for applying such torque is shown.

Accurate as these systems are, they are not sufficiently so where a continuously accurate azimuth indication is essential to gun laying and torpedo aiming by swiftly moving craft against others moving equally rapidly. The error is caused by the departure of the plane of the stabilized azimuth frame of the gyrocompass from the true vertical due to imperfect stabilization of the gyrocompass by the stable element. Accordingly, the torque motor applies a correction where no correction is required, and over-correction and consequent error result. Thus a new source of error is introduced by the stabilizing system itself.

In accordance with the present invention, a correcting mechanism for such stabilizing systems is provided which is capable of distinguishing between actual tilt of the gyroscope due to deviation of the compass and error in level due to imperfect stabilization, and to correct accordingly, so that over-correction for the compass deviation is precluded.

As applied to a stabilized gyrocompass wherein the correction for azimuth deviation is made by applying a torque about the tilt axis of the compass proportional to the tilt, the correction comprises a heavily-damped pendulum secured to the stator of the torque applying device journalled in the stabilized azimuth frame coaxially with the trunnion axis of the gyroscope carrying the rotor of the torque applying device. The damping means for the pendulum preferably comprises a viscous liquid contained in a receptacle on the azimuth frame in which is imposed a vane mounted on or forming part of the pendulum.

It will be seen that with the arrangement of the present invention strong damping of the pendulum causes it to provide a more accurate indication of the vertical at all times and, when a long-continued acceleration occurs, the pendulum, in effect, goes out of action, so that there is no response of the device to the acceleration error. A properly-damped pendulum will give an accuracy within a tenth of a minute as compared to the accuracy of several minutes of the usual device.

For a more complete understanding of the invention, reference may be had to the accompanying drawings, in which:

Figure 1 is a fragmentary side elevation of a compass gyroscope and its stabilized azimuth mounting ring, showing the pendulum correcting device of this invention;

Fig. 2 is an axial section through the azimuth ring, as seen along the line 2—2 of Fig. 1, showing the pendulum mounting and damping arrangement; and, Fig. 3 is a simplified diagrammatic representation of the correcting pendulum, illustrating its operation.

Referring to Figs. 1 and 2 of the drawings, numeral 10 designates the casing of the usual compass azimuth gyroscope, one trunnion 12 of which is shown journaled in sensitive bearings 11 within the torque applying device 13. As described in greater detail in said U.S. Patent 2,810,291, the torque applying device 13 comprises a rotor winding 12' mounted on the trunnion 12, within its stator winding 13' mounted within the casing of torque applying device 13 normally fixedly mounted on the azimuth frame or ring 14, which is stabilized usually from a remote stable element, as is well understood.

One of the windings 12' or 13' is energized so that as the rotor winding 12' tilts relatively to the stator winding 13', or vice versa, a torque is applied about the axis of the trunnion 12 to cause the gyroscope 10 to precess in azimuth back to the meridian. When the rotor winding 12' is restored to neutral or non-inductive relation to stator winding 13' the torque motor 13 deenergizes itself.

Instead of fixedly mounting stator winding 13' on the stabilized azimuth frame 14, in the apparatus of the present invention the stator winding 13' is journalled thereon by supporting its casing 13 in ball-bearings 15 interposed between it and the stabilized azimuth frame 14, as shown particularly in Fig. 2. In this way, the stator winding 13' becomes relatively movable to the rotor winding 12'.

Carried by the casing 13, to which the stator winding 13' is fixed, is a pendulum 16 comprising the depending lever 18 secured at its upper end by screws 17 to casing 13 and carrying the weight 19 and the vane 20 at its lower end. The vane 20 is immersed in a viscous liquid, such as heavy oil, within a receptacle 21' formed on the stabilized azimuth frame 14, as shown especially in Fig. 2. The swing of pendulum 16 about the axis of trunnion 12 is accordingly damped by the viscous liquid 21 and its total swing is also limited in each direction by engagement of extension 22' with stop screws 22 adjustably mounted on azimuth ring or frame 14.

In operation of stabilizing system correction mechanism of this invention, a tilt of the gyroscope 10 relatively to the stabilized azimuth frame 14 causes the torque applying device 13 to exert a torque about the coordinate axis of the gyroscope 10 to cause it to precess back to the meridian, as is described in greater detail in said U.S. Patent 2,810,291. Such tilt of the gyroscope 10, in previous arrangements, might however, be due to a cause other than departure of the gyroscope 10 from the meridian since the pick-up device measured tilt from the stabilized azimuth frame 14 which itself departed, from time to time to some extent, from the vertical. Such an azimuth frame cannot, by any method now known, be so accurately stabilized as to be kept continuously truly vertical and if the gyroscope 10 does not lose the meridian and thereby tilt during the interval when the azimuth frame 14 is slipping away from true vertical, then, without the present invention, the pickup device would nevertheless induce a voltage and cause a correction to be applied in azimuth to the gyroscope 10 where no correction is required. Thus an error in azimuth would be actually caused by a mechanism intended to prevent such errors, not to cause them. As stated, the basis of this new or correction error in azimuth is the error inherent in whatever mechanism is provided to stabilize the azimuth frame 14 in the vertical and if a mechanism could be provided to give a more accurate vertical, this artificially created azimuth error would be correspondingly reduced. Modern stable elements give a vertical accurate to within a few minutes but a properly damped pendulum will give a vertical indication accurate to within tenths of a minute, when free from acceleration.

The present invention, therefore, makes use of the highly damped pendulum 16, mounted for limiting swing upon the vertically stabilized frame 14 of the system, thereby giving, as a base for the action of the torque applying device 13, a better vertical than the remote stable element provides at all times except when there is long-continued acceleration. And, when there is such acceleration, the device of this invention goes automatically out of action while still leaving the very good vertical furnished by the stable element. Thus, particularly in evasive action in modern warfare, for instance, azimuth indication is rendered very reliable. This action is illustrated semi-diagrammatically in Fig. 3, wherein the pendulum 16 is shown with its swing greatly exaggerated for clarity in that the angle V, which represents the error of the stabilized frame 14 from true vertical, is shown as several whole degrees, whereas in Fig. 2 the angle would very seldom exceed three minutes of arc and the stop-screws 22 would limit the swing of the pendulum 16 to no more than that each way. Thus, in Fig. 3 the true vertical is illustrated by the line 23—23 and the vertical furnished to the frame 14 by the line 24—24.

The trunnion 12 of the gyroscope 10 is shown as not having departed from vertical, i.e. the pointer 16' on the pendulum and the pointer of 14' are aligned and thus there is no tilt due to loss of azimuth. In this condition there is no displacement between windings 12' and 13' and no torque applied to the gyroscope 10 because of the angular error V and there is none applied. The pendulum 16, by remaining relatively stationary, in effect rotates stator winding 13' relatively to its supporting azimuth ring or frame 14, thus preventing the application of the angle V to the torque-applying device 13 by furnishing the accurate vertical 23—23 from which to measure tilt.

As the azimuth frame 14 weaves back and forth across true vertical within the limits allowed it, the pendulum 16 hangs in the true vertical 23—23 and provides a base for operation of the torque motor to measure tilt which is properly measured at all times from the true horizontal or vertical. Ordinary or transient accelerations do not have much effect on the pendulum 16 due to the drag of the heavy viscous damping fluid 21 in the cup 21' but should there be a persistent acceleration strong enough to throw the pendulum 16 out of the vertical, it is restrained by engagement of its extension 22' with the stops 22 to a value no greater than the allowed or expected error in vertical stabilized frame 14. Adjustment of stops 22 is effected to adjust this value at will.

Because the stator winding 13' has freedom to rotate with the pendulum 16 within the stabilized azimuth frame 14, the response of the torque applying device 13 is accurate and may be considered as superimposing an ultimate or vernier correction for the usual imperfect stabilization and rendering it accurate within tenths of a minute against the best former accuracy of several minutes.

Although a preferred embodiment of this invention has been illustrated and described herein, it is to be understood that the invention is not limited thereby but is susceptible of changes in form and detail within the scope of the appended claims.

I claim:

1. In a stabilizing system for a gyroscope journalled about a horizontal axis on a stabilized frame mounted on an unstable support, the combination of a first winding carried by said gyroscope, a second winding inductively related to said first winding and carried by said frame for limited movement relatively thereto, one of said windings being energized whereby a voltage is induced in the other of said windings in response to relative tilt about said axis to exert a torque about said axis, a pendulum suspended for movement about said axis, and mechanical connections between said pendulum and one of said windings for modifying the relation between said windings.

2. In a stabilizing system for a gyroscope journalled about a horizontal axis on a stabilized frame mounted on an unstable support, the combination of a first winding carried by said gyroscope, a second winding inductively related to said first winding and carried by said frame for limited movement relatively thereto, one of said windings being energized whereby a voltage is induced in the other of said windings in response to relative tilt about said axis to exert a torque about said axis, a pendulum suspended for movement about said axis, and mechanical connections between said pendulum and said second winding for modifying the relation between said windings.

3. In a stabilizing system for a gyroscope journalled about a horizontal axis, on a frame mounted on an unstable support, the combination of a first winding carried by said gyroscope for movement therewith about said axis, a second winding inductively related to said first winding and carried by said frame for limited movement relatively thereto, one of said windings being energized whereby a voltage is induced in the other of said windings in response to relative tilt about said axis to exert a torque about said axis, a pendulum suspended for movement about said axis, and connections between said pendulum and one of said windings for modifying the relation between said windings.

4. In a stabilizing system for a gyroscope journalled about a horizontal axis on a frame mounted on an unstable support, the combination of a first winding carried by said gyroscope for relative movement therewith about said axis, a second winding inductively related to about said first winding and carried by said frame for limited movement relatively thereto, one of said windings, being energized whereby a voltage is induced in the other of said windings in response to relative tilt about said axis, to exert a torque about said axis, a pendulum suspended for movement about said axis, and mechanical connections between said pendulum and one of said windings for modifying the relation between said windings.

5. In a stabilizing system for a gyroscope journalled about a horizontal axis on a frame mounted on an unstable support, the combination of a first winding carried by said gyroscope for relative movement therewith about said axis, a second winding inductively related to said first winding and carried by said frame for limited movement relatively thereto and for relative movement therewith about said axis, one of said windings being energized, whereby a voltage is induced in the other of said windings in response to relative tilt about said axis, to exert a torque about said axis, a pendulum suspended for movement about said axis, and mechanical connections between said pendulum and one of said windings for modifying the relation between said windings.

6. In a stabilizing system for a gyroscope journalled about a horizontal axis on a frame mounted on an unstable support, the combination of a first winding carried by said gyroscope for relative movement therewith about said axis, a second winding inductively related to said first winding and carried by said frame for limited movement relatively thereto and for relative movement therewith about said axis, one of said windings being energized whereby a voltage is induced in the other of said windings in response to relative tilt about said axis to exert a torque about said axis, a pendulum suspended for movement about said axis, means mounting said second winding for movement relatively to said frame, and mechanical connections between said pendulum and said second winding for modifying the relation between said first and second windings.

7. In a stabilizing system for a gyroscope journalled about a horizontal axis on a frame mounted on an unstable support, the combination of a first winding carried by said gyroscope, a second winding inductively related to said first winding and carried by said frame for limited movement relatively thereto, one of said windings being energized whereby a voltage is induced in the other of said windings in response to relative tilt about said axis to exert a torque about said axis, a pendulum suspended for movement about said axis, mechanical connections between said pendulum and one of said windings for modifying the relation between said windings, and means for damping the said movement of pendulum relatively to said frame about said axis.

8. In a stabilizing system for a gyroscope journalled about a horizontal axis on a frame mounted on an unstable support, the combination of a first winding carried by said gyroscope, a second winding inductively related to said first winding and carried by said frame for limited movement relatively thereto, one of said windings being energized whereby a voltage is induced in the other of said windings in response to relative tilt about said axis to exert a torque about said axis, a pendulum suspended for movement about said axis, mechanical connections between said pendulum and one of said windings for modifying the relation between said windings, a container enclosing a part of said pendulum, and a viscous liquid in said container for damping the movement of said pendulum about said axis.

9. In a stabilizing system for a gyroscope journalled about a horizontal axis on a frame mounted on an unstable support, the combination of a first winding carried by said gyroscope, a second winding inductively related to said first winding and carried by said frame for limited movement relatively thereto, one of said windings being energized whereby a voltage is induced in the other of said windings in response to relative tilt about said axis to exert a torque about said axis, a pendulum suspended for movement about said axis, mechanical connections between said pendulum and one of said windings for modifying the relation between said windings, and stop means limiting the movement of said pendulum in each direction of its swing relatively to said frame about said axis.

10. In a stabilizing system for a gyroscope journalled about a horizontal axis on a frame mounted on an unstable support, the combination of a first winding carried by said gyroscope, a second winding inductively related to said first winding and carried by said frame for limited movement relatively thereto, one of said windings being energized whereby a voltage is induced in the other of said windings in response to relative tilt about said axis to exert a torque about said axis, a pendulum suspended for movement about said axis, mechanical connections between said pendulum and one of said windings for modifying the relation between said windings, damping means on said frame for damping the movement of said pendulum about said axis, and stop means on said frame for limiting the movement of said pendulum in each direction of its swing relatively to said frame.

11. In a stabilizing system for a gyroscope tiltable about a horizontal axis on a frame mounted on an unstable support, the combination of a housing journalled on said frame coaxially with said gyroscope, a rotor winding carried by said gyroscope and positioned coaxially within said housing, a stator winding carried by said housing and inductively encircling said rotor winding, one of said windings being energized whereby relative movement between said windings induces a responsive voltage in one of said windings to exert a torque about said axis, and a pendulum secured to said housing for movement relatively to said frame about said axis, whereby movement of said pendulum modifies the angular relation between said stator winding and said frame.

12. In a stabilizing system for a gyroscope tiltable about a horizontal axis on a frame mounted on an unstable support, the combination of a housing journalled on said frame coaxially with said gyroscope, a rotor winding carried by said gyroscope and positioned coaxially within said housing, a stator winding carried by said housing and inductively encircling said rotor winding, one of said windings being energized whereby relative movement between said windings induces a responsive voltage in one of said windings to exert a torque about said axis, a pendulum secured to said housing for movement relatively to said frame about said axis, whereby movement of said pendulum modifies the angular relation between said stator winding and said frame, and means for damping the movement of said pendulum relatively to said frame.

13. In a stabilizing system for a gyroscope tiltable about a horizontal axis on a frame mounted on an unstable support, the combination of a housing journalled on said frame coaxially with said gyroscope, a rotor winding carried by said gyroscope and positioned coaxially within said housing, a stator winding carried by said housing and inductively encircling said rotor winding, one of said windings being energized whereby relative movement between said windings induces a responsive voltage in one of said windings to exert a torque about said axis, a pendulum secured to said housing for movement relatively to said frame about said axis, whereby movement of said pendulum modifies the angular relation between said stator winding and said frame, a container on said frame and enclosing a part of said pendulum, and a viscous liquid in said container for damping the movement of said pendulum relatively to said frame.

14. In a stabilizing system for a gyroscope tiltable about a horizontal axis on a frame mounted on an unstable support, the combination of a housing journalled on said frame coaxially with said gyroscope, a rotor winding carried by said gyroscope and positioned coaxially within said housing, a stator winding carried by said housing and inductively encircling said rotor winding, one of said windings being energized whereby relative movement between said windings induces a responsive voltage in one of said windings to exert a torque about said axis, pendulum secured to said housing for movement relative to said frame about said axis, whereby movement of said pendulum modifies the angular relation between said stator winding and said frame, means for damping the movement of said pendulum relatively to said frame, and a stop means on said frame for limiting the movement of said pendulum in opposite directions.

References Cited in the file of this patent

UNITED STATES PATENTS

| | | |
|---|---|---|
| 1,545,479 | Boykow | July 14, 1925 |
| 1,981,687 | Carter | Nov. 20, 1934 |
| 2,293,707 | Braddon | Aug. 25, 1942 |
| 2,410,602 | Davis | Nov. 5, 1946 |
| 2,429,612 | Curry | Oct. 28, 1947 |